XEROGRAPHIC FACSIMILE PRINTER HAVING LIGHT SCANNING AND ELECTRICAL CHARGING

Original Filed Sept. 9, 1963 2 Sheets-Sheet 1

INVENTORS.
PETER A. BUTTON
JACK V. MILLER
PAUL F. KING

INVENTORS.
PETER A. BUTTON
JACK V. MILLER
PAUL F. KING

United States Patent Office 3,396,235

Patented Aug. 6, 1968

3,396,235

XEROGRAPHIC FACSIMILE PRINTER HAVING LIGHT SCANNING AND ELECTRICAL CHARGING

Peter A. Button, Arcadia, and Jack V. Miller, Azusa, Calif., and Paul F. King, Webster, N.Y., assignors to Xerox Corporation, Rochester, N.Y., a corporation of New York Continuation of application Ser. No. 307,552, Sept. 9, 1963. This application Dec. 2, 1966, Ser. No. 598,879
16 Claims. (Cl. 178—6.6)

ABSTRACT OF THE DISCLOSURE

A method of and apparatus for recording electro-temporal information as an electrostatic image on a photoconductor is disclosed. An inductive electrode is utilized to impress a time-varying electric field across the photoconductor while actinic electromagnetic radiation switches the photoconductor from non-conductive to conductive and back to non-conductive status to trap a charge proportional to the varying-intensity electric field on its surface.

This is a continuation of Ser. No. 307,552, filed Sept. 9, 1963 and now abandoned.

The present invention relates to facsimile systems in general and more particularly relates to a facsimile printer based on xerographic techniques.

Facsimile is the name given to a way of sending pictures and handwritten or printed material by wire or radio. News services often use facsimile to transmit news to newspapers and television stations. Banks, railroads, and other organizations have adopted facsimiles for business purposes. Small newspapers have been published experimentally by facsimile. Facsimile is made possible because radio currents can be modified by light as well as by sound. Any change in the waves caused by light at the sending station will be reproduced at the receiving station.

According to an earlier form of facsimile which is still in widespread use today, a picture to be sent is placed on a revolving cylinder at the sending station. A tiny beam of light is then passed back and forth over the picture. The beam of light is reflected onto a photoelectric cell that changes light waves into electric current. When the light ray strikes the lighter parts of the picture, more of the ray is reflected, and the photoelectric cell sends out a stronger current. When the light ray strikes a dark part of the picture, less light is reflected, and the photoelectric cell sends out a weaker current. In this way, the light and dark places of the picture are reproduced in terms of electric current. This varying electric current is transmitted to a distant receiving station by modulating a carrier signal with it. When the signal current is reproduced at the receiving set, it passes from a printer blade through damp, chemically treated paper to a wire that is wound around a revolving cylinder. The chemicals in the paper react as the current passes from the blade through the paper to the wire. A strong current makes a dark spot, and a weak current produces a lighter spot. The different degrees of black and white in the picture are thereby reproduced on the paper.

More recent facsimile equipment is operated in the same basic manner but uses flying-spot scanning methods instead. More specifically, in the printer, a very small spot of light on the face of a cathode-ray tube is made to sweep in one dimension. The photosensitive paper, on the other hand, moves in a direction that is perpendicular to the sweep line, thereby producing a raster. The intensity of the light spot is varied or modulated in order to produce light and dark areas on the photosensitive or output copy paper. The same type of scanning system is used in the transmitting equipment. The light from a flying-spot scanner is projected onto the copy to be transmitted. The reflected light is then converted to a video signal with a photomultiplier tube. Of course, the two flying-spot scanners are synchronized together as is the input copy in the transmitter and the photosensitive material in the receiver.

The present invention involves the dual concept of employing xerographic methods in a facsimile printer together with an optical system that is used only to create a raster scan and which is not an integral part of the information transfer. Xerography, briefly stated, is a dry printing process that uses static electricity. More specifically, it involves the formation of an electrostatic image on an insulating photoconductive surface by exposure of the uniformly-charged layer to light. This latent image is then developed by allowing it ot collect finely-divided powder particles which are later transferred to a permanent support, such as a sheet of paper, for example. Finally, the powder image is fixed to the support by the most appropriate of several means such as heating, softening by solvent vapor, or spraying the image with transparent lacquer.

A facsimile printer according to the present invention basically includes a conductive drum coated with a highly insulating photoconductive material such as amorphous selenium, an induction device, and a light-scanning system. The purpose of the light-scanning system is to move an extremely small spot of light of constant intensity laterally across the surface of the drum at a high rate. The induction device or inductor comprises a rigid transparent insulator base in which are imbedded one or more strips of conductive material, one of the strips being transparent. The inductor is stationary with respect to the axis of rotation of the drum so that there is relative motion between the two. Furthermore, the insulator surface is contiguous to the photoconductive surface of the drum, the two surfaces either being in slidable contact or separated by a very small and uniform air gap maintained between them when the printer is in operation. The light-scanning system is set so that the spot of light passes through the conductive strip and the insulator base of the inductor to the photoconductive surface of the drum.

In its operation, a voltage corresponding to a video signal is established between the metal drum on which the selenium photoconductor is deposited and the transparent conductive strip in the induction device. The conductive strip forms a capacitor with the metal on which the selenium is coated. Consequently, when light strikes the photoconductor, it turns from an insulator to a partial conductor and allows charges to flow to its surface. When the spot of light moves, the area of the photoconductor where the spot was originally becomes an insulator again and charges become trapped on the photoconductor surface. These trapped charges can then be developed using normal electrostatic development methods of the type mentioned briefly above. As the spot of light is moved laterally across the drum, the voltage between the conductors change, thereby depositing varying amounts of charge according to the video signal. The combined rotation of the drum and the lateral scan of the spot of light form a raster on the drum. With proper synchronization of the scanning device, the drum rotation, and the video signal, a latent electrostatic facsimile image can be deposited on the surface of the selenium drum.

An alternative of the above system is one where the charge migration is in the same direction as is normally encountered in xerography. Before the induction device moves into proximity with the selnium surface, a positive charge is deposited on the selenium photoconductor surface. Later, when the inductor is contiguous to the selenium surface and when the spot of light strikes a certain area thereon, a voltage of the correct polarity which is established between the transparent conductive strip and the metal backing of the selenium photoconductor will establish a field which will hold some of the positive charges in position on the selenium surface. When the light is moved to another area, the remaining charges will be trapped on the selenium surface. The amount of trapped charges in any particular area will again depend on the established voltage or electric field when light was striking that area. This alternative method is different from the first in that in the first method positive charges were made to move from the metal plate on which the selenium surface was deposited, through to the surface of the selenum. In this method, positive charges on the selenium surface move to the metal backing plate when light strikes that particular area, unless an electric field tending to hold them on the selenium surface has been established by the induction device. Electric fields causing the motion of charges or holes in the selenium are inherently stronger in the alternative approach than they are in the first approach in that the voltage difference establishing the field exists only across the selenium layer instead of the combined insulator-selenium layer.

As can be seen, the operating principles of a printer according to the present invention are quite different than those in the prior art, the primary difference being that even though a flying-spot scan system is employed, there is no intensity modulation of the spot of light. Instead, the spot is used only as a switching mechanism. More particularly, because the light spot is not modulated, the cathode-ray tube usually associated with flying-spot scanners can be replaced by a mechanical scanning system. This fact in itself offers several advantages over conventional methods. These advantages include faster writing speeds due to more intense light sources, smaller spot diameter over a wider printing width, and very good scan stability offering good spatial precision in the output copy. A smaller spot size means greater resolution in the generated latent image and high spatial precision makes color facsimile transmission quite feasible in that the separate color images, when combined, could have very good registration.

Morever, as will be seen later, embodiments of the invention offer the further advantages over the prior art of being relatively small in size and of simple construction.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only and are not intended as a definition of the limits of the invention.

FIGURE 1 is a schematic presentation of one embodiment of a facsimile printer according to the present invention;

FIGURE 2 presents an enlarged view in cross-section of the inductor-drum portion in the system of FIG. 1;

Figure 1:
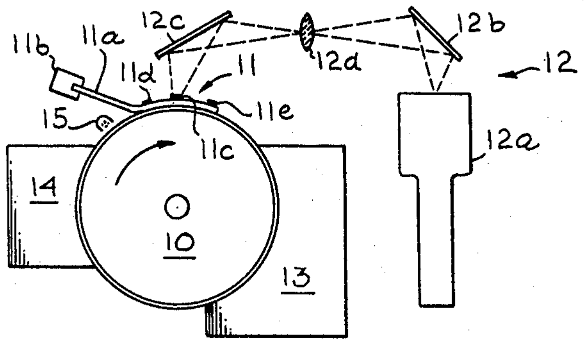

Considering now the drawings, reference is made in particular to FIG. 1 wherein one embodiment of a facsimile printer according to the present invention is shown to basically include a conductive drum 10 that is coated with a highly insulating photoconductive material, such as amorphous selenium; induction apparatus generally designated 11; an optical or light-scanning system general designated 12; development and print-out equipment 13; drum cleaner apparatus 14; and, if required, a charging device 15.

Considering the printer elements delineated above in somewhat greater detail, selenium-coated drum 10 is a standard well-known element and, hence, need not be described in any great detail here. Suffice it, therefore, to show a small cross-sectional portion of the drum in FIG. 2 wherein the drum is shown to comprise a metal cylinder **10*a* whose surface is coated with a selenium layer 10*b*, the selenium-cylinder combination consitituting the xerographic surface. As might be expected, drum 10** is mounted on a shaft journaled in a frame to rotate in the direction indicated by the arrow, thereby causing the drum surface sequentially to pass a plurality of xerographic processing stations.

Figure 2:
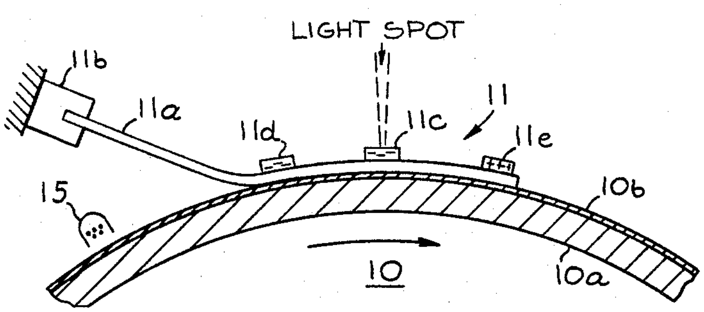

Induction apparatus 11, as is shown in FIG. 1 and more clearly so in FIG. 2, includes a length or belt of transparent insulating material **11*a* attached at one end either to the printer framework or to a suitable anchor 11*b*, a portion of the insulator surface at the other end being allowed to rest on and, therefore, to slide over selenum layer 10*b*. Since belt 11*a* is anchored, it is stationary and, therefore, there is relative motion between the belt and drum. Coated on top of insulator 11*a* or else imbedded in its surface is a long and narrow strip 11*c* of transparent conductive material, the length of strip 11*c* being at least equal to the line scan length of the spot of light and its width being slightly greater than the spot size. Assuming the existence of irregularities on the rigid surface of selenium-coated drum 10, belt 11*a* is made flexible so that it will conform as much as possible to these irregularities, thereby helping to control the capacitance parameters of the inductor assembly by reducing any possible air gaps or bubbles to a minimum. To further aid in the abovesaid control of the capacitance parameters, a conductive strip 11*d* may be coated on or imbedded in the insulator surface parallel to and upstream from transparent conductor 11*c*. By applying a suitable bias to conductor 11*d*, an electrostatic force is created between this conductive strip and conducting substrate 10*a*** that holds the belt in intimate contact with the selenium surface.

In addition to the abovesaid, a polarity-reversing element **11*e* may also be included as part of induction apparatus 11. Element 11*e*, like elements 11*c* and 11*d*, is in the form of a conductive strip either coated on or imbedded in the surface of insulator 11*a* parallel to and downstream from transparent conductor 11*c*. More specifically, for reasons that will be presented later, polarity-reversing element 11*e*** is preferably located at the very end of the insulator.

The mechanical relationship between drum 10 and induction apparatus 11 is clearly illustrated in FIG. 2 wherein insulator belt **11*a* is shown in intimate contact with a relatively small surface area of selenium layer 10*b*, the desired contact between them being provided by means of electrostatic forces developed between conductive cylinder 10*a* and conductive strip 11*b*. It will be recognized that the belt-drum combination is in essence a moving capacitor, the belt containing one plate of the capacitor (conductive strip 11*c*) and the drum providing the other capacitor plate (metal cylinder 10*a*), dielectric layer 11*a* and photoconductive layer 10*b*** lying between these two plates.

The purpose of optical scanning system 12 in FIG. 1 is to produce a spot of light which is to be linearly scanned across the selenium-coated drum in a direction parallel to the drum's axis of rotation. The three main design criteria of the optical system are that the length of scan of the light spot must be equal to the width of the copy that is to be printed, the size of the light spot must be smaller than the eye can resolve at the minimum distance of distinct vision, and the light spot flux must be such that, at the desired frequency of the facsimile printer and surface exposure to the selenium, the selenium becomes sufficiently conducting so that charges will flow and become trapped on its free surface. The optical system shown in FIG. 1 includes a flying-spot scanner 12*a*, a couple of mirrors 12*b* and 12*c* which reflect the moving spot of light onto the photoconductive layer, and a lens 12*d* interposed between the two mirrors for properly projecting the light reflected from mirror 12*b* to mirror 12*c*.

However, as was previously mentioned, a mechanical scanning system may be substituted to a very great advantage. Basically, such a mechanical system would employ a light source, a single lens and a rotating reflecting polygon which would be located immediately behind the lens. The radiant energy would pass through the lens twice, once on its way from the light source to the reflecting polygon and the second time on its way from the polygon's surface to the drum where it would be focused by the lens as a tiny spot of light on the photoconductor surface. The 'light traces would be produced in response to the movement of the polygon sides, which movement would cause the angle of incidence and reflection to change.

As for development and print-out equipment 13 and drum cleaner 14, equipment 13 is that portion of the printer system that produces a visible record of the desired latent image and cleaner 14 is that portion of the system that thereafter cleanses the drum by removing any residual development material that may have been left on its surface, thereby making it ready for the next cycle of operation. By way of example, drum cleaner 14 may be a pair of rapidly-revolving fur brushes and may also include a discharge lamp installed between these brushes and charging device 15 for the purpose of removing any residual charges from the selenium surface before it is reused. Drum cleaner apparatus of the kind that may easily be adapted for use in the facsimile printer of the present invention can be found in the patent to L. E. Walkup et al., entitled "Electrostatic Cleaning of Xerographic Plates," Patent No. 2,752,271, issued June 26, 1956, or in the patent to M. I. Turner, Jr., et al., entitled "Brush Cleaning Device," Patent No. 2,751,616, issued June 26, 1956. Similarly, development and print-out equipment can be found in the patent to R. G. Vyverberg, entitled "Xerographic Machine," Patent No. 2,885,955, issued May 12, 1959, or in the patent to H. O. Ulrich, entitled "Xerographic Development Electrode Apparatus," Patent No. 3,011,474, issued Dec. 5, 1963. As was previously indicated, charging device 15 may be used if needed and examples of charging that could be adapted for use can be found in the patent to R. W. Gundlach, entitled "Xerographic Charging Device," Patent No. 2,790,082, issued Apr. 23, 1957, or in the patent to L. E. Walkup, entitled "Charging Device," Patent No. 2,879,395, issued Apr. 24, 1959.

Figure 3:
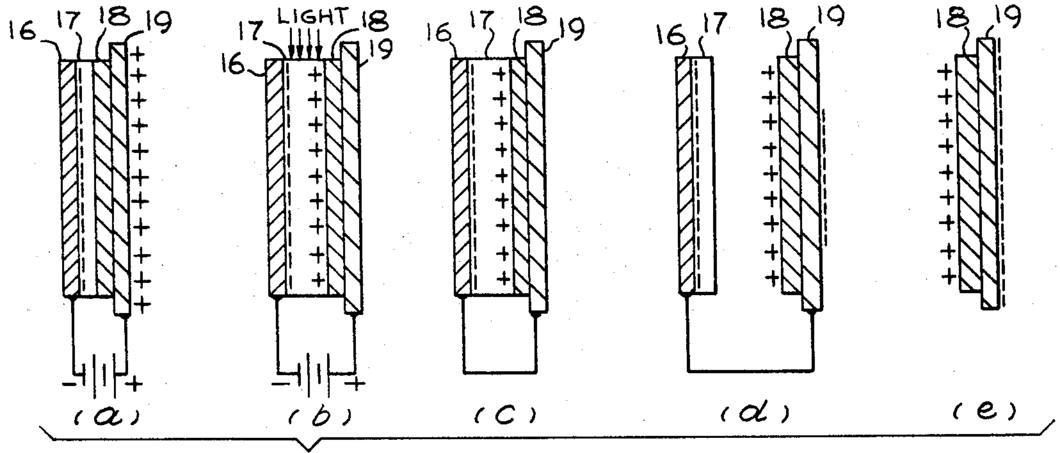
FIGURES 3–5 illustrate the underlying principles that govern the operation of the present invention.

The underlying operating principles of the present invention may be explained by the simplified arrangement illustrated in FIG. 3 to which reference is now made. In FIG. 3(*a*) an induction plate 16 is initially separated by an insulator 17 from a layer of selenium 18 deposited on a conducting substrate 19. The process is started with the application of voltage across the two conducting plates 16 and 19 for, under the influence of the resulting electric field, positive charges will migrate from conducting substrate 19 to the free surface of selenium layer 18 when the latter is illuminated. This step is depicted in FIG. 3(*b*). Upon removal of the light from the photoconductor, as is illustrated in FIG. 3(*c*), the charges become trapped on the selenium free surfaces. The separation of the plates thereafter and the resulting migration of negative charges are depicted by the functional steps presented in FIGS. 3(*d*) and 3(*e*). A standard process is then employed for the development of the latent image trapped on the surface of layer 19.

Considering now the operation of the FIG. 1 system, a carrier signal containing the desired information is demodulated in a conventional manner to produce a variable voltage which may hereinafter be referred to as an analog signal. This analog signal is applied between drum cylinder 10*a* and transparent conductive strip 11*c*. As was previously explained, in the area of contact between drum 10 and inductor 11, transparent conductor 11*c* forms a capacitor with metal cylinder 10*a*. Accordingly, when a spot of light directed at transparent conductor 11*c* in the abovesaid area of contact passes through it and through transparent insulator 11*a*, the selenium at the point of incidence turns from an insulator to a partial conductor and thereby allows positive charges to flow to its surface. Consequently, as the spot of light produced by optical system 12 is moved laterally across the belt and drum, the voltage and, therefore, the electric field between the conductors change, thereby causing varying amounts of charge to become deposited on the selenium surface. When the drum surface thusly exposed moves out from under the spot of light, the selenium loses its conductive quality so that the charges that have migrated to its surface are trapped and remain thereon. It will thus be recognized that the combined rotation of the drum and the lateral scan of the spot of light form a raster on the drum, with the result that a complete latent electrostatic facsimile image is ultimately deposited on the surface of the selenium drum.

As drum 10 rotates, this latent image passes to development and print-out equipment 13 wherein it is processed to prodce a visible image on specially treated paper. The drum then passes alongside drum cleaner apparatus 14, which as heretofore mentioned, cleans the selenium surface and thereby prepares it for reuse.

Figure 4:
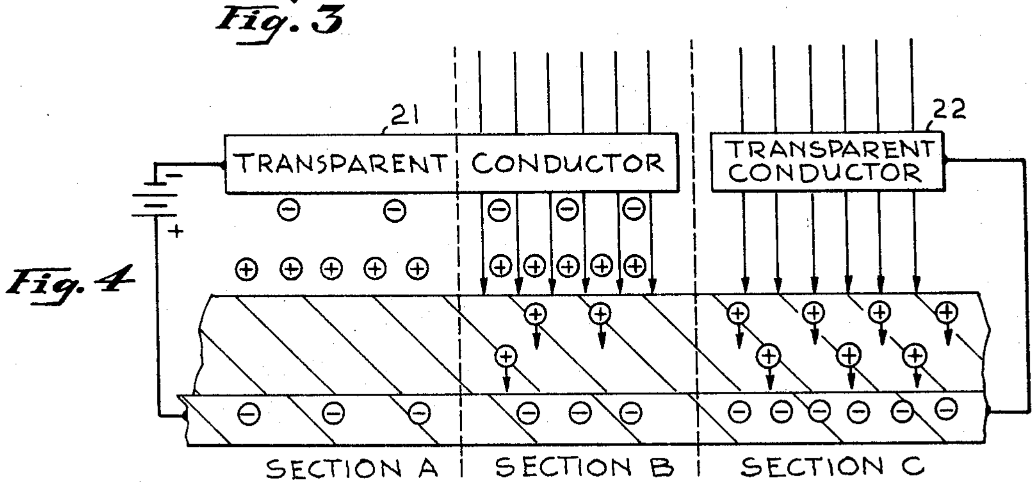

In the induction method described above, positive charges are made to move from the metal drum cylinder to the surface of the selenium layer. However, a charge induction deposition method which depends on positive charges moving in the same direction as they do in the standard xerographic process, namely, toward the conducting drum cylinder, may also be used in the printer system of FIG. 1 and the basic principles of such an alternative approach are illustrated in FIG. 4. More particularly, the selenium surface is charged by a positive ion source before the process begins. FIG. 4 shows two transparent conductors 21 and 22 spaced very close to the selenium surface beneath them. The transparent conductor above the selenium surface in sections A and B, namely, conductor 21, is at a high negative potential, while conductor 22 in section C is at ground potential. When light is present on the selenium surface, as in sections B and C, the positive charge are dissipated in the usual xerographic manner. However, in section B, a strong electric field exists in both the selenium film and the air gap and this field has the effect of retaining some of the positive charges on the surface of the selenium. In section C, on the other hand, where no electric field exists, all or substantially all of the positive charges have left the selenium surface and moved to the metal substrate beneath. Since there is no light in section A, none of the positive charges are dissipated.

The printer using this method uses the same physical equipment as the induction printer discussed before in connection with FIG. 1, with the exception of a charging device 15 which would be added before the scanning station to deposit a positive charge on the selenium drum. The latent image produced on the drum with this technique would have the same polarity as one produced by the prior induction process. However, such a technique would have the advantage of producing a better response time, thereby allowing much higher scanning speeds and video signal rates.

Due to some negative charge on the belt, the positive charge distribution on the photoconductor surface may to some extent be adversely affected during separation of the belt from the photoconductor's surface. To avoid the possibility of any attenuation of charge and the image degradation that might result therefrom, the facsimile printer in FIG. 1 may be modified so as to apply a positive voltage to the induction plate prior to separation, thereby strengthening the latent image on the selenium surface. The desired modification can be achieved by including conductive strip 11e and applying a suitable positive voltage between it and drum cylinder 10a.

Figure 5:
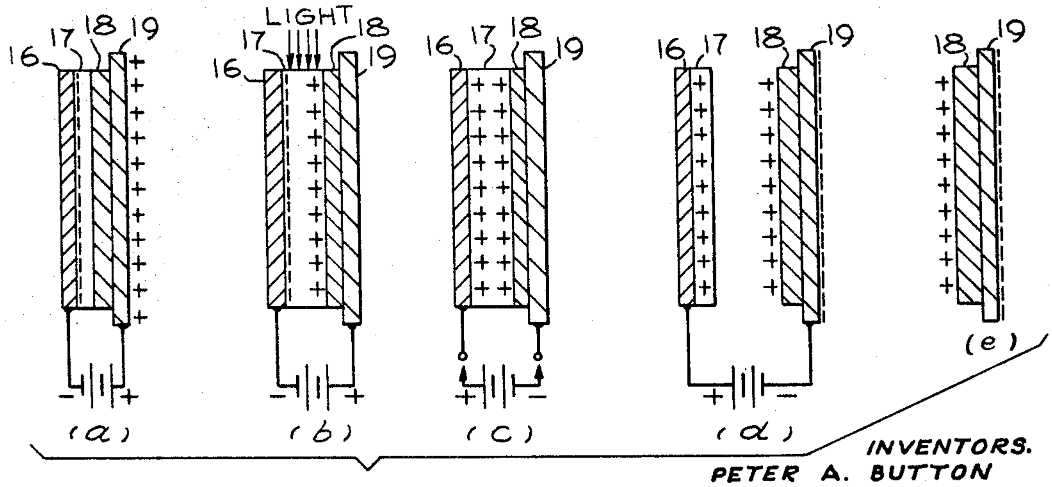

In order to more fully understand the effect produced by the utilization of polarity-reversing conductor 11e, reference is made to FIG. 5 wherein the FIG. 3 arrangement comprising induction plate 16, insulator 17, selenium layer 18 and conducting substrate 19 is reproduced in FIG. 5(*a*). With the application of a negative voltage between conducting plates 16 and 19 and the establishment of an appropriate electric field therebetween, positive charges will flow from substrate 19 to the free surface of selenium layer 18 when the latter is illuminated, as is depicted in FIG. 5(*b*). It will now be noted from FIG. 5(*c*) that after the radiation has been removed from the photoconductor surface, the polarity of the applied voltage is reversed, that is to say, during the separation process a positive potential is applied to the inductor plate and a negative one is applied to the substrate. The functional step of separation and voltage reversal is presented in FIG. 5(*d*). The final result shown in FIG. 5(*e*) is that obtained in the original process but improved due to the prevention of latent image attenuation, that is to say, due to the prevention of positive charge being transferred from selenium surface 18 to insulator surface 17 during their separation.

Figure 6:
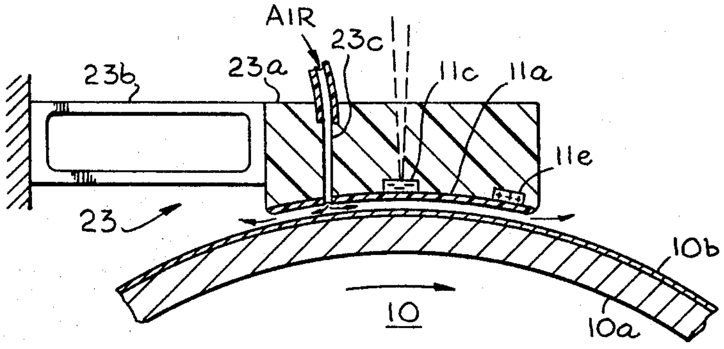
FIGURE 6 illustrates the inductor-drum combination in another embodiment of the invention.
Figure 7:
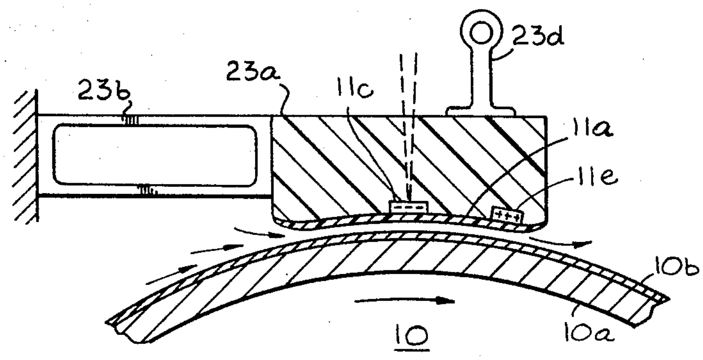
FIGURE 7 illustrates one way in which the inductor-drum combination of FIG. 6 may be modified.

Having thus described the FIG. 1 embodiment and various modifications thereto, reference is now made to FIGS. 6 and 7 wherein another embodiment of the invention is illustrated. As shown in FIG. 6, this further embodiment includes, as before, conductive drum cylinder 10a and photoconductive layer 10b coated thereon. It also includes an air-bearing support inductor, generally designated 23, which includes a transparent inductor body 23a that is mounted over photoconductive layer 10b in face-to-face relationship therewith. While inductor body 23a may be mounted in any one of several ways, it is shown mounted in a cantilevered manner in the figure, member 23b providing the cantilevered support.

A transparent insulating film or layer 11a is bonded to the bottom surface of the inductor body which is positioned so that insulating layer 11a is contiguous to photoconductive layer 10b. The inductor body also has imbedded in it one or more parallel conductors, one of which is transparent. More specifically, a transparent conductive strip 11c is imbedded in inductor body 23a immediately above insulating layer 11a, the conductive strip preferably being centrally located between the sides of the inductor body so that a beam of light projected through these elements to the photoconductive layer below will be normal to the surfaces thereof. For the reasons previously explained, a polarity-reversing conductive strip 11e may also be imbedded in inductor body 23a immediately over insulating layer 11a, in this case the conductive strip being located close to the free side of the inductor body, that is, close to the point whereat the insulating and photoconductive layers separate. Finally, inductor body 23a includes a passageway 23c through which a gas, such as air, may flow to the space or gap between layers 10b and 11a. To provide such a flow, a gas source (not shown) would, of course, be coupled to passageway 23c. Needless to say, a scanning system 12, development and print-out equipment 13, and a drum cleaner 14, all of the kind previously described, would also be included in the FIG. 6 embodiment. However, to avoid unnecessary duplication, these members have been omitted from the figure.

Considering now its operation, insulating film 11a is in intimate contact with photoconductive surface 10b when the drum is stationary. However, prior to the start of rotation of the drum, air or some other gas is introduced under pressure through passageway 23c to lift the inductor body away from the surface of the photoconductive layer. By controlling the gas-flow rate and the parameters of force against the drum, a gas film of minute thickness is produced between the drum and the inductor body which is thereafter maintained so long as the printer is in operation. As for the process of producing an electrostatic image, the steps involved remain the same as previously described. Hence, briefly, a very thin sweeping beam of light is projected through inductor body 23a, conductive strip 11c and insulating layer 11a to the surface of photoconductive layer 10b. The photoconductive layer is thusly scanned by a tiny spot of light and, in response thereto and in response to the variable voltage simultaneously applied between conductive substrate 10a and conductive strip 11c, positive charges are caused to migrate to the surface of layer 10b where they are trapped when that portion of the drum moves out from under the light. The electrostatic image thusly formed is then developed to produce a permanent visible image. If polarity-reversing conductive strip 11e is utilized, then a positive voltage is also applied between conductive substrate 10a and strip 11e.

Instead of injecting a gas under pressure for the purpose of providing and maintaining a gap between layers 10b and 11a, the same ends may be attained by employing hydrodynamic principles. Accordingly, the machine in FIG. 6 may be modified as shown in FIG. 7, the modification consisting of eliminating passageway 23c and adding instead a lifting lug 23d. The lug is connected to inductor body 23a and is used to lift the inductor body away from the surface of photoconductive layer 10b until the drum achieves full operational speed, at which point air friction will cause a film of moving air to be distributed between the inductor body and the drum. The lifting apparatus is then released and the inductor body will thereafter be supported on a small but constant air gap produced in accordance with hydrodynamic gas-bearing principles.

Although a couple of embodiments of the invention and various modifications thereof have been illustrated above by way of example, it is not intended that the invention be limited thereto. For example, instead of a drum, an annular metal disc whose annular surface is photoconductively coated may also be used, with the conductive strips being positioned above the disc along radii thereof. Again, instead of electrostatic forces, a spring action may be used to obtain the desired intimate contact between the transparent insulator and the photoconductive layer. Accordingly, the invention should be considered to include any and all modifications, alternations or equivalent arrangements falling within the scope of the annexed claims.

Having thus described the invention, what is claimed is:

1. A fascimile printer for converting a variable voltage corresponding to a video signal to an electrostatic image, said printer comprising: a rotating conductive drum whose lateral surface is coated with a photoconductive layer; a length of transparent insulating material mounted contiguously to and in face-to-face relationship with said photoconductive layer; a strip of transparent conductive material mounted on said insulating layer, the variable voltage being applied between said strip and drum, and optical means for scanning said transparent conductive strip with a tiny spot of light of constant intensity, whereby said photoconductive layer is likewise scanned with said spot of light to cause variable amounts of electrical charge to become deposited on its surface, the amount of charge deposited varying as the applied voltage.

2. The facsimile printer defined in claim 1 wherein said printer further includes apparatus for depositing a uniform positive charge on the surface of said photoconductive layer, said apparatus being mounted contiguous to said photoconductive layer and positioned so as to deposit said positive charge on an area thereof before said area moves into contiguous relationship with said insulating material.

3. A facsimile printer for converting a variable voltage corresponding to a video signal to an electrostatic image, said printer comprising: a rotating conductive drum whose lateral surface is coated with a photoconductive layer; a length of transparent insulating material anchored at one end and having a portion at its other end resting on and in intimate face-to-face contact with said photoconductive layer; a strip of transparent conductive material mounted on said insulating layer in the portion thereof that is in contact with said photoconductive layer, the variable voltage being applied between said strip and drum; and optical means for scanning said transparent conductive strip with a tiny spot of light of constant intensity, whereby said photoconductive layer is likewise scanned with said spot of light to cause variable amounts of electrical charge to become deposited on its surface, the amount of charge deposited varying as the applied voltage.

4. A facsimile printer for converting a variable voltage corresponding to a video signal to an electrostatic image, said printer comprising: a moving conductive plate whose free surface is coated with a photoconductive layer; inductor apparatus mounted over said photoconductive layer and including a stationary length of transparent insulating material mounted contiguously to and in face-to-face relationship with said photoconductive layer, and a strip of transparent conductive material mounted on said insulating layer perpendicularly to the direction of motion of said plate, the variable voltage being applied between said strip and plate; and optical means for scanning said transparent conductive strip with a tiny spot of light of constant intensity, whereby said photoconductive layer is likewise scanned with said spot of light to cause variable amounts of electrical charge to become deposited on its surface, the amount of charge deposited varying as the applied voltage.

5. In a facsimile printer, apparatus for converting a variable voltage corresponding to a video signal to an electrostatic image on a photoconductively coated metal plate, said apparatus comprising: a stationary length of transparent insulating material mounted contiguously to and in face-to-face relationship with said photoconductive coating; a strip of transparent conductive material mounted on said insulating material perpendicularly to the direction of motion of said plate, the variable voltage being applied between said strip and plate; and optical means for scanning said transparent conductive strip with a tiny spot of light of constant intensity.

6. Inductor apparatus for use in a facsimile printer in which a variable voltage applied between said apparatus and an electrically conductive plate is converted to an electrostatic image on a photoconductive layer coated on said plate when said apparatus and photoconductive layer are simultaneously scanned by a tiny spot of light of constant intensity, said apparatus comprising: a length of transparent insulating material; a strip of transparent conductive material mounted across the width of said insulating material; and means for applying the variable voltage between said strip and the plate.

7. A facsimile printer for converting a variable voltage corresponding to a video signal to an electrostatic image, said printer comprising: a capacitor having one stationary and transparent plate and one moving plate, the space between the plate of said capacitor being filled with a pair of dielectric layers, the dielectric layer adjacent the stationary plate also being transparent and stationary and the dielectric layer adjacent the moving plate being made of a photoconductive material that moves with the plate; means for applying the variable voltage between said pair of plates; and optical means for scanning said photoconductive dielectric layer with a tiny spot of light of constant intensity that is projected through said transparent plate and dielectric layer, whereby said photoconductive dielectric layer becomes conductive in response to the light incident thereon to cause electric charge to become deposited on its surface whose magnitude corresponds to the amplitude of the applied voltage.

8. A facsimile printer for converting a variable voltage corresponding to a video signal to an electrostatic image, said printer comprising: a moving conductive plate whose free surface is coated with a photoconductive layer; indicator apparatus mounted over said photoconductive layer and including a stationary length of transparent insulating material mounted contiguously to and in face-to-face relationship with said photoconductive layer, a strip of transparent conductive material mounted on said insulating layer perpendicularly to the direction of motion of said plate, the variable voltage being applied between said strip and plate and another strip of conductive material mounted on and at the downstream end of said insulating material parallel to said first strip; means for applying a fixed voltage between said other strip and said plate whose polarity is opposite to that of the variable voltage; optical means for scanning said transparent conductive strip with a tiny spot of light of constant intensity, whereby said photoconductive layer is likewise scanned with said spot of light to cause variable amounts of electric charge to become deposited on its surface, the amount of charge deposited varying as the applied variable voltage; and equipment positioned contiguous to said photoconductive layer for converting said electrostatic image to a permanent visible image on a paper medium.

9. The facsimile printer defined in claim 8 wherein said printer further includes apparatus for depositing a uniform positive charge on the surface of said photoconductive layer, said apparatus being mounted contiguous to said photoconductive layer and positioned so as to deposit said positive charge on an area thereof before said area moves into contiguous relationship with said insulating material.

10. A facsimile printer for converting a variable voltage corresponding to a video signal to an electrostatic image, said printer comprising: a rotating conductive drum whose lateral surface is coated with a photoconductive layer; a gas-bearing support indicator including an inductor body made of a transparent insulating material fixedly mounted over said photoconductive layer, a transparent insulating film bonded to said inductor body at the bottom side thereof, said inductor body being positioned so that said insulating film is contiguous to said photoconductive layer, and transparent conductor imbedded in said inductor body immediately above said insulating film, the variable voltage being applied between said conductor and drum; means for producing a flow of gas in the space between said insulating film and said photoconductive layer to provide support for said inductor body above said photoconductive layer; and optical means for scanning said transparent conductor with a tiny spot of light of constant intensity projected through said inductor body, whereby said photoconductive layer is likewise scanned with said spot of light to cause variable amounts of electrical charge to become deposited on its surface, the amount of charge deposited varying as the applied voltage.

11. The printer defined in claim 10 wherein said means includes a gas passageway through said inductor body and said insulating film to the space between said film and said photoconductive layer; and a source of gas under pressure coupled to said passageway.

12. The printer defined in claim 10 wherein said means includes a lifting lug mounted on said inductor body for lifting said inductor body away from said photoconductive surface until said drum achieves full operational speed; and structural means on said inductor body for hydrodynamically supplying a flow of air between said insulating and photoconductive layers sufficient to thereafter support said inductor body.

13. A facsimile recorder comprising:
a continuous photoconductive insulating member,
electrically conductive support means for supporting said photoconductive member with at least a portion of one major surface of said member being contiguous therewith,
an induction electrode cooperably juxtapositioned with said support means for impressing a time-varying electric field across at least a portion of said photoconductive member in response to electric information signals, and
scanning means for rendering selective elemental areas of said photoconductive member conductive in a predetermined pattern, by scanning it with a small area, high intensity source of actinic electromagnetic radiation.

14. A facsimile recorder according to claim 13 wherein said induction electrode comprises an insulative element in contact with said photoconductive member and a conductive means adjacent said insulative element on the side of said insulative element opposed to said photoconductive insulating member for applying a potential with respect to said support means.

15. A facsimile recorder according to claim 14 further including development means to make visible the latent electrostatic image on said continuous photoconductive insulating member produced by trapped charges on the surface of said photoconductive insulative member.

16. A method of recording electro-temporal information signals as latent electrostatic images on a photoconductive insulating surface comprising the steps of:

(a) establishing a time-varying electric field across predetermined elemental areas of said photoconductive insulating surface as a function of said electro-temporal information signals to be recorded, and
(b) scanning said photoconductive surface with a small high intensity light spot while simultaneously maintaining said time-varying electric field across said photoconductive insulating surface to
(1) momentarily switch selected elemental areas of said photoconductive surface from a non-conductive to a conductive state, and
(2) thereafter to switch said selected elemental areas back to a non-conductive state from said conductive state whereby a charge, proportional to the instantaneous value of said varying-intensity electric field as the light spot switches said elemental area, is trapped at selected ones of said elemental areas of the free surface of said photoconductor when said photoconductor switches from the conductive to the non-conductive state.

References Cited

UNITED STATES PATENTS

| | | | |
|---|---|---|---|
| 3,199,086 | 8/1965 | Kallmann | 178—6.6 |
| 3,301,947 | 1/1967 | Stone | 178—6.6 |

ROBERT L. GRIFFIN, *Primary Examiner.*
H. W. BRITTON, *Assistant Examiner.*

UNITED STATES PATENT OFFICE
CERTIFICATE OF CORRECTION

Patent No. 3,396,235 August 6, 1968

Peter A. Button et al.

It is certified that error appears in the above identified patent and that said Letters Patent are hereby corrected as shown below:

Column 10, lines 8 and 9, "indicator" should read -- inductor --; line 42, "indicator" should read -- inductor --.

Signed and sealed this 3rd day of March 1970.

(SEAL)
Attest:

Edward M. Fletcher, Jr.
Attesting Officer

WILLIAM E. SCHUYLER, JR.
Commissioner of Patents